United States Patent Office 3,809,603
Patented May 7, 1974

3,809,603
LAMINATES AND ADHESIVE COMPOSITIONS
Edward Kooi, Jersey City, N.J., George Odynski, Woodhaven, N.Y., and Leo J. Stage, Roselle Park, N.J., assignors to Arvey Corporation
No Drawing. Filed Feb. 22, 1972, Ser. No. 228,397
Int. Cl. B32b 15/08, 27/38, 27/40
U.S. Cl. 161—186   6 Claims

ABSTRACT OF THE DISCLOSURE

The present invention relates to improved laminates and methods of making laminates. In accordance with the invention laminate structures can be made from a pre-formed polyethylene homopolymer film and a metal sheet with an adhesive composition. The adhesive contains a vinyl chloride copolymer resin, a polyurethane resin, an epoxy resin, and products of in situ reactions of a polyfunctional organic isocyanate and a polyhydric phenol. The adhesive is applied in a solution of the resins in a solvent mixture selected from the group consisting of aromatic hydrocarbons, aliphatic ketones and lower alkyl esters.

BACKGROUND OF THE INVENTION

This invention relates to the art of lamination and more particularly to a laminate comprising a polyolefin film and a method of adhesively laminating a pre-formed film to a metal base.

It has long been desired to manufacture laminates in which polyolefin film and particularly polyethylene comprises one layer of the laminate. A laminate of a polyolefin homopolymer and a metal base is particularly desirable for use in the communications and electrical cable industries. It is known, for example, that when the metal sheeting of an electrical cable is protected with a resin coating the resistance of the cable to breakdown from environmental factors is greatly enhanced and the serviceable life of the cable is thereby increased.

Pre-formed polyethylene film has a number of desirable properties that make it particularly useful. For example polyethylene offers resistance to the corrosive effects of environmental factors, is available as a pre-formed film and is more economical than a number of other resins. However, polyethylene is a non-adherent material and a serious problem has been to securely adhere polyethylene film to a base material such as a metal.

Attempts have been made to modify the properties of polyethylene films so that a better bond is achieved in manufacturing the laminate. For example, a copolymer of polyethylene and a vinyl monomer with a reactive carboxyl group, such as disclosed in U.S. Pat. Nos. 2,987,-501 and 3,027,346, have been suggested since the carboxyl component of the copolymer can form chemical bonds with metals. However, copolymers of polyethylene suffer from serious disadvantages in that they are not as economical as unmodified polyethylene and also may require the laminate to spend extended residence time in ovens at elevated temperatures in order to achieve a satisfactory film to metal bond. Others have tried to form a satisfactory bond of polyethylene to a base material by extruding polyethylene onto metal. Such techniques suffer from the difficulty that they require special equipment and high temperatures and have not proved to be satisfactory.

Surprisingly, a laminate has now been found comprising a pre-formed polyethylene film, adhesively bonded to a base material such as a metal which overcomes the disadvantages heretofore encountered in the manufacture of laminates made from pre-formed polyethylene films. A method of manufacturing pre-formed polyethylene film/metal laminates has also been found which meets the standards required of such laminates in the communications and electrical cable industries.

SUMMARY OF THE INVENTION

This invention relates to improved laminate structures and more particularly, it relates to laminate structures comprising synthetic plastics such as polyethylene film adhesively bonded to a metal base. The invention also relates to a compsition of enhanced adhesive properties for use in the production of laminated structures.

The laminates of the present invention comprise a synthetic resin film and a base material adhered together with an adhesive composition comprising a vinyl chloride copolymer resin, a polyurethane resin, an epoxy resin, and products of in situ reactions of a polyfunctional organic isocyanate and a polyhydric phenol agent in a solution of the resins in a solvent mixture selected from the group consisting of aromatic hydrocarbons, aliphatic ketones and lower alkyl esters.

In accordance with the method of the invention a base material such as a metal sheet or foil is first cleaned to remove oils, dirt and other residue which may interfere with the formation of a satisfactory bond. The metal base material is then coated with the adhesive of the invention after which the adhesive is dried. Pre-formed polyethylene film is thereafter adhered to the metal base material.

Adhesive bonding of laminate structures has long been accepted in the industrial arts. For example, adhesives have been suggested for bonding metal to metal such as those of the polyamide polymers disclosed in U.S. Pat. No. 3,525,779 or the epoxy resin adhesives of U.S. Pat. No. 3,371,008. These adhesives, however, have not proved satisfactory in bonding a pre-formed film of a homopolymer of polyethylene to a base material such as a metallic surface in that laminates using such adhesives exhibit insufficient tensile strength, peel strength and shear strength.

In manufacturing electrical cable, such as telephone cable, the conducting core is normally surrounded and encased in a plurality of shielding layers. One such shielding layer may comprise a metal foil laminated on one or both sides with a thin layer of resinous material such as polyethylene film. A laminate of this type may be wrapped around the more fragile core and then extrusion coated with a thick outer jacket of polyethylene to produce the finished cable. It is known in the electric cable industry that when the relatively thick plastic jacket is properly bonded to the metal foil laminate the cable is better able to withstand bending without wrinkling and has a higher elongation at break. In order to meet the minimum requirements of the cable industry, the outer relatively thick polyethylene jacket must adhere to the metal foil laminate cable layer with a minimum of 10 pounds per inch of peel adhesion.

As previously discussed, this requirement has not heretofore been satisfactorily met with a pre-formed film of polyethylene homopolymer due to the non-adherent nature of polyethylene. Now it has been discovered that laminates comprising a layer of a pre-formed film of polyethylene homopolymer can be made to meet the requirements of the cable industry when bonded by an adhesive composition comprising a vinyl copolymer, a polyurethane resin, and an epoxy novolac resin crosslinked by a polyfunctional organic isocyanate and a polyhydric phenol, when present in proper amounts. The laminates of this invention exhibit peel adhesion factors which were not heretofore available with the use of adhesives and were only believed to be available when polyethylene copolymer films were used.

The term vinyl copolymers useful in the present invention include copolymers of vinyl acetate and vinyl butyrates with acrylic esters, vinyl chlorides with vinyl acetate and maleic acid modified vinyl chloride-vinyl acetate copolymer.

The polyurethane resins of the invention are reaction products of isocyanates such as phenyl isocyanate, toluene diisocyanate, hexamethylene diisocyanate and the like with polyhydric alcohols such as the alkylene glycols (ethylene glycol, butylene glycol); alkyl ethers of glycols such as methyl ether of ethylene glycol, ethyl ether of ethylene glycol, n-butyl ether of ethylene glycol, phenyl ether of ethylene glycol, ethyl ether of diethylene glycol, methyl ether of propylene glycol, methyl ether of tripropylene glycol, hydroxy alkyl glycidyl ethers and the like.

The epoxy resins useful in the composition of the invention may be glycidyl ethers of polyhydric phenols, bisphenols, glycols, glycerine, polyalkylene glycols, novolac resins and the like.

The inocyanates employed in the adhesive composition may be mono or polyfunctional organic isocyanates such as phenyl isocyanate, toluene di-isocyanate, hexamethylene di-isocyanate. Polymethylene polyphenylisocyanate has been found to be a suitable isocyanate.

The term polyhydric phenols includes dihydric phenols such as catechol, resorcinol, n-hexyl resorcinol, trihydric phenols such as pyrogallol, pholoroglucinol and the like.

In preparing the adhesive composition of this invention the presence of the various ingredients of the formulation in amounts by weight is:

| | Percent |
|---|---|
| Vinyl copolymer | 4 to 34 |
| Polyurethane resin | 30 to 50 |
| Epoxy resin | 8 to 22 |
| Organic isocyanate | 2 to 9 |
| Polyhydric phenol | 8 to 15 |

If the amount of any one component of the adhesive is varied within the specified range while the percentage of the other components is kept constant laminates of polyethylene homopolymer film and a metal foil thus produced maintain a peel adhesion of at least 10 pounds per inch.

Solvent useful in forming a fluid mixture of the components of the adhesive are those which are of relatively high volatility. The solvents include aromatic hydrocarbons such as toluene, xylene, benzene and the like, aliphatic ketones such as methyl ethyl ketone, and the like, and esters such as lower alkyl acetate, ethyl propionate, propyl acetate, and the like.

In the following example one embodiment of the invention is illustrated.

EXAMPLE

An adhesive composition was formulated by mixing the specified components of the adhesive to produce the solid weight ratio shown and the solution weight ratio shown:

| Components | Co. and trade name | Solids, weight percentage | Solution, weight percentage |
|---|---|---|---|
| Maleic acid modified vinyl chloride vinyl acetate copolymer. | Union Carbide, Bakelite VMCH. | 33.33 | 6.65 |
| Polyurethane resin | Naftone Inc., Desmocoll 400. | 33.33 | 6.65 |
| Epoxy novolac resin | Dow Chemical, Den 438. | 16.66 | 3.88 |
| Polymethylene polyphenyl isocyanate. | Upjohn Co., PAPI. | 8.34 | 1.66 |
| Resorcinol | | 8.34 | 1.66 |
| Ethyl acetate | | | 13.58 |
| Toluene | | | 38.50 |
| Methyl ethyl ketone | | | 27.42 |

The bonding strength of laminates using conventional adhesives such as (1) the ethylene acrylic acid based adhesives produced by A.D.M. Tronics; (2) the epoxy based adhesives (Cybond W E 4058-d) produced by American Cyanamid Co.; (3) polyester isocyanate adhesives and the acrylic based adhesives produced by E. I. du Pont de Nemours & Co.; and (4) polyurethane adhesives produced by Polymer Corporation, were compared with laminates produced in accordance with the present invention. Laminates of polyethylene to aluminum were similarly prepared and tensile machine tested with the jaws of the testing machine set to separate at the rate of 12 inches per minute. In the laminates formed from the conventional adhesives previously mentioned peel adhesion failure of the film to aluminum occurred primarily at about 1 pound per inch with occasional film to aluminum failure occurring at 2 pounds per inch. In contrast the laminates of the present invention had a peel adhesion failure of the film to aluminum of at least 3 pounds per inch.

The increased strength of the laminates of the present invention are even more startlingly demonstrated when laminates using the present invention are produced in accordance with the accepted laboratory test conditions used in the cable industry.

Laminates were produced in simulation of the polyethylene to polyethylene bond at the overlap bond of the metal foil-polyethylene laminate layer which occurs in the production of cable. The film to film bonds were produced at 400° F., under 40 pounds per square inch of pressure for 10 seconds dwell time. The laminates produced in this manner using conventional adhesives gave film to film peel strength in accordance with the tensile testing technique already described of 1 pound per inch to 2 pounds per inch, whereas laminates of the present invention have a minimum film to film peel strength of 7 pounds per inch.

The improved results obtained with the laminates of the present invention are more startlingly shown in tests showing the peel adhesion of the relatively thick polyethylene shielding layer to the metal foil-film laminate which usually forms an inner layer of the cable. In practice the relatively thick outer jacket is extrusion coated over the film of the inner metal foil-film laminate cable layer.

In testing the peel adhesion, heat seals were formed in accordance with accepted cable industry standards wherein a 0.071 inch slab of polyethylene film was bound to the film side of a metal foil-film laminate at 400° F. for 10 seconds oven dwell time at 15 pounds of pressure per square inch. Under these conditions the conventional adhesives yielded peel strengths of from 1 pound to 4 pounds per inch. In contrast the peel strengths of the structures using the laminate of the present invention was from 10 pounds to 15 pounds per inch.

In accordance with the method of the invention a base material such as a metal sheet or foil is first cleaned to remove oils, dirt and other residue which may interfere with the formation of a satisfactory bond.

Laminated structures were then prepared in accordance with the invention by spreading a generally uniform coating of adhesive on an aluminum foil sheet by means of a roller coater. The aluminum foil coated sheet can then be passed through a heating oven wherein a temperature higher than the boiling point solvent is maintained, i.e., for the above solvents, a temperature of about 300° F. in order to flash evaporate the solvents. The coated side of the aluminum sheet is next brought into contact with a pre-formed polyethylene film and the two pass between squeeze rollers. The laminate may thereafter pass into contact with a chill roller to lower the laminate temperature after which the laminate is passed between a final pair of squeeze rollers. The process can then be repeated to laminate a second polyethylene film to the other side of the aluminum sheet.

While the invention is particularly useful in adhering homopolymer polyethylene films to achieve improved peel strengths other synthetic films may also be used. In practicing the method of this invention, the surface of the film to be laminated should be a coating receptive surface i.e., a surface oxidized by chemical or physical means in order to form a more secure bond.

While the laminates and method of preparing laminated compositions of the present invention have broad applicability they are particularly useful in the communication cable industry. Heretofore communication cables have comprised an inner conducting core surrounded by protective shielding layers comprising a metallic shielding layer having on one or both sides thereof a polyethylene copolymer film or other resin. A relatively thick synthetic resin coating was then applied to the film as the outer protective jacket of the cable.

Prior to the present invention it was not possible to utilize pre-formed polyethylene homopolymer film to laminate the metallic shielding layer of the cable inasmuch as satisfactory peel strengths of the film to the metal could not be achieved. In view of this problem manufacturers of cable tape which is essentially the metal foil-film laminate, had to rely on copolymers of polyethylene. By use of the laminate and methods of the present invention it is possible to mnufacture communication cables using pre-formed polyethylene homopolymer film or other resins which meet the standards of the communications industry.

While specific embodiments of improved laminates and methods of manufacturing laminates have been disclosed in the foregoing description, it is understood that various modifications within the scope and spirit of the concept of the invention may occur to those skilled in the art. Therefore, it is intended that no limitation be placed on the scope of the invention except as defined by the scope of the appended claims.

We claim:
1. An improved laminate comprising a pre-formed polyethylene film adhered to a metal base with a cured adhesive composition which, when applied, comprises a mixture of essentially from 4% to 34% vinyl copolymer, from 30% to 50% polyurethane resin, from 8% to 22% epoxy resin, from 2% to 9% organic polyisocyanate, and from 8% to 15% of a dihydric or trihydric phenol.

2. The improved laminate of claim 1 in which said epoxy resin is a glycidyl ether of a polyhydric phenol, a glycol, glycerine, a polyalkylene glycol or a novolac resin.

3. The improved laminate of claim 1 in which said vinyl copolymer is a maleic acid modified copolymer of vinyl chloride and vinyl acetate.

4. The improved laminate of claim 1 in which said polyisocyanate is polymethylene polyphenylisocyanate.

5. The improved laminate of claim 1 in which said dihydric or trihydric phenol is resorcinol.

6. The improved laminate of claim 1 in which said metal is aluminum.

References Cited

UNITED STATES PATENTS

| | | | |
|---|---|---|---|
| 3,663,513 | 5/1972 | Kazama et al. | 161—190 |
| 3,426,097 | 2/1969 | Ilkka et al. | 161—190 |
| 3,510,439 | 5/1970 | Kaltenbach et al. | 161—190 |
| 3,136,681 | 6/1964 | Johnston | 161—190 |
| 3,354,237 | 11/1967 | Shaw | 161—190 |
| 3,391,054 | 7/1968 | Lewis et al. | 161—190 |
| 3,392,148 | 7/1968 | Zech et al. | 161—190 X |
| 3,422,165 | 1/1969 | Brotherton et al. | 161—190 X |
| 3,511,741 | 5/1970 | Elder | 161—190 X |
| 3,600,289 | 8/1971 | Bragde | 161—190 X |
| 3,067,085 | 12/1962 | Limperos | 161—254 X |

OTHER REFERENCES

Skeist, Irving: "Handbook of Adhesives," Reinhold Publishing Corp., New York City, 1962, frontispiece, pp. 336, 337, 338, 340.

CLIFTON B. COSBY, Primary Examiner

U.S. Cl. X.R.

161—190, 213, 215, 216, 248, 254; 260—858, 859 PVR